Patented Aug. 7, 1945

2,380,934

UNITED STATES PATENT OFFICE 2,380,934

SUBSTITUTED UREAS

William Robert Boon, Blackley, Manchester, England, assignor to Imperial Chemical Industries Limited, a corporation of Great Britain No Drawing. Application December 30, 1941, Serial No. 425,007. In Great Britain January 13, 1941

8 Claims. (Cl. 260—247)

The present invention relates to substituted ureas of the general formula

X—CO—NR'—(CH$_2$)$_n$—NR''—CO—Y wherein X and Y, which are not necessarily alike, each stands for the secondary amino group corresponding with an aliphatic or heterocyclic secondary amine, X—H and Y—H respectively, of which the molecular weight is not more than 120, wherein R' and R'' stand for alkyl groups which are not necessarily alike and which jointly contain not more than 8 carbon atoms, and wherein $n$ is any integer from 2 to 6 inclusive.

Compounds in which X and Y are alike are described and claimed in my copending application Serial No. 425,006, filed of even date herewith. The present application discloses methods which are adapted either to result in compounds as above wherein X and Y are different, or compounds where they are alike. In the latter instance the process forms an alternative to that disclosed in the said copending application. Accordingly, therefore, the present application contains claims to novel compounds wherein X and Y are different from one another as well as claims to methods adapted to the preparation of either group of compounds.

Amongst the properties of all these bis-ureas which make them useful are their physiological properties, as shown by their effect on the living organism, which are such that they may be used as stimulants of the respiratory and vasomotor centres, and for that purpose they are very valuable, as the ratio of active dose to toxic dose is very low.

According to the invention a bis-urea of the formula hereinbefore given is made from a monourea of the general formula X—CO—NR'—(CH$_2$)$_n$—NHR'' either by causing this mono-urea to interact with a carbamyl chloride of formula Y—CO—Cl; or by treating this mono-urea with phosgene whereby there is obtained a carbamyl chloride which is then caused to interact with an amine of the formula Y—H.

In all the above formulae X, Y, R' and R'' have the significance given in the first paragraph of this specification.

It will be seen that when Y in Y—CO—Cl or in Y—H is the same as X in the formula given above for the monourea, then the present invention provides, as said, an alternative means of making the new bis-ureas of co-pending application Serial No. 425,006, whereas by using a carbamyl chloride Y—CO—Cl or an amine Y—H wherein Y is different from X, many new unsymmetrical compounds of diverse physical and physiological properties can be obtained.

The production of the starting-out compounds, which themselves are new, is also a feature of the invention. These new compounds of formula X—CO—NR'—(CH$_2$)$_n$—NHR'' as given above, are made by treating an N:N'-dialkylalkylene diamine NHR'—(CH$_2$)$_n$—NHR'', wherein R' and R'' have the same meanings as before (and so may be alike or different) with one molecular proportion of a carbamyl chloride X—CO—Cl. However, if no extraneous acid absorbing agent is added, part of the dialkylalkylene-diamine combines with the HCl split off and is thrown out of solution. In actual practice therefore it is advisable to start with more than 1 mole of the diamine per mole of the carbamyl chloride.

The invention is illustrated but not limited by the following examples in which the parts are by weight.

*Example 1*

67 parts of diethyl carbamyl chloride dissolved in 150 parts of toluene are added with stirring to a cooled solution of 75 parts of N:N'-dimethyl trimethylenediamine in 450 parts of toluene at such a rate that the reaction temperature does not rise above 0° C. At the end of the reaction 42 parts of N:N'-dimethyltrimethylenediamine dihydrochloride are filtered off and washed with toluene. The filtrate and washings are now distilled whereby there is obtained 50 parts of N:N'-dimethyltrimethylenediamine - N'-carboxylic diethylamide, a colourless, strongly basic liquid of B. P. 141° C. at 10 mm. which is miscible in all proportions with water, ethanol, benzene and light petroleum; on further distillation a second fraction consisting of 25 parts of N:N'-dimethyltrimethylenediamine - N:N' - dicarboxylic bisdiethylamide of B. P. 210° C./10 mm. is obtained.

In a similar manner by the interaction of 87 parts of N:N'-diethylethylenediamine with 67.7 parts of diethylcarbamyl chloride there is obtained 75 parts of N:N'-diethylethylenediamine-N'-carboxylic diethylamide as a colourless, strongly basic liquid of B. P. 126° C. at 17 mm. and 31 parts of N:N'-diethylethylenediamine N:N'-dicarboxylic bis-diethylamide, a colourless liquid of B. P. 218° C. at 19 mm. which is miscible in all proportions with ethanol and benzene and moderately soluble in water.

Example 2

20 parts of N:N'-dimethyltrimethylenediamine-N'-carboxylic diethylamide and 7.5 parts of piperidine-N-carboxylic chloride are mixed together. Reaction occurs with evolution of heat. After the reaction has ended the mixture is dissolved in 100 parts of water and solid potassium carbonate is added until the solution is saturated. The solution is warmed to 100° C. for a short time, then cooled. An oily layer is formed. 100 parts of benzene are added and the oil dissolves therein. The benzene solution is separated and dried over anhydrous potassium carbonate and then distilled whereby there are obtained, as two fractions, 9 parts of unchanged N:N'-dimethyltrimethylenediamine-N-carboxylic diethylamide and 15 parts of N:N'-dimethyltrimethylenediamine N'-carboxylic diethylamide N-carboxylic piperidide as a colourless liquid of B. P. 245° C. at 17 mm. which is moderately soluble in water and is miscible in all proportions with ethanol, benzene and petroleum ether.

In a similar manner by the interaction of 23 parts of N:N'-diethyl ethylene diamine-N'-carboxylic diethylamide and 14 parts of diethylcarbamyl chloride there are obtained 29 parts of N:N'-diethylethylenediamine-N:N'-dicarboxylic bis-diethylamide of B. P. 218° C. at 19 mm. together with 10 parts of unchanged N:N'-diethylethylenediamine-N'-carboxylic diethylamide.

Example 3

94 parts of diethylcarbamyl chloride dissolved in 300 parts of toluene are added with stirring to a cooled solution of 144 parts of N:N'-dimethylhexamethylenediamine in 800 parts of toluene at such a rate that the reaction temperature does not rise above 0° C. By working up the reaction mixture as described in Example 1 there are obtained 90 parts of N:N-diethyl-N'-methyl-N' - (6 - methylaminohexyl) - urea, a strongly basic liquid of B. P. 182° C. at 12 mm. pressure which is moderately soluble in water, and 40 parts of N:N'-dimethylhexamethylenediamine-N:N'-dicarboxylic bisdiethylamide of B. P. 229° C. at 9 mm. pressure.

24 parts of N:N-diethyl-N'-methyl-N'-(6-methylaminohexyl)-urea are mixed with 9 parts of morpholine-N-carboxylic chloride. When the reaction is ended 13 parts of N:N'-dimethylhexamethylenediamine - N - carboxylic diethylamide-N'-carboxylic morpholide of B. P. 248° C. at 9 mm. pressure are isolated as described in Example 2.

Example 4

40 parts of N:N-diethyl-N'-methyl-N'-(3-methylaminopropyl)urea dissolved in 150 parts of dry ether are gradually added, with stirring, to a cooled solution of 10 parts of phosgene in 100 parts of dry ether at such a rate that the temperature does not exceed —10° C. When the reaction is complete the N:N-diethyl-N'-methyl-N'-(3-methylaminopropyl) - urea hydrochloride which has separated out is filtered off and washed with 50 parts of dry ether. The filtrate and washings are combined and the ether is distilled off. The residue, which consists essentially of N:N'-dimethyl-trimethylenediamine-N-carboxylic-diethyl amide-N'-carbonyl chloride, is added to a solution of 20 parts of dimethylamine in 80 parts of benzene. Dimethylamine hydrochloride separates out and is filtered off. The benzene solution remaining is distilled whereby there are obtained 15 parts of N:N'-dimethyltrimethylenediamine-N-carboxylic diethylamide N'-carboxylic dimethylamide, which is a colour-oil of B. P. 210° C. at 9 mm. pressure, which is miscible with water.

Whereas the above examples illustrate some embodiments of the invention, it will be obvious to one skilled in the art that many other embodiments and variations can be devised without departing from the spirit and scope thereof and it is therefore to be understood that the invention is not limited to the particular embodiments described above, but only as defined in the following claims.

I claim:

1. Process for the manufacture of dialkyl-alkylene-bis-ureas of the formula

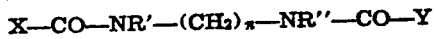

which comprises causing a carbamyl chloride Y—CO—Cl, wherein Y stands for the secondary amino group corresponding with a secondary amine Y—H which is a member of the class consisting of dialkyl and unsubstituted heterocyclic secondary amines with molecular weights not exceeding 120, to interact with a urea of formula

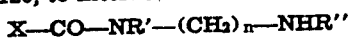

wherein X stands for the secondary amino group corresponding with a secondary amine X—H which is a member of the class consisting of dialkyl and unsubstituted heterocyclic secondary amines having molecular weights not exceeding 120, wherein R' and R'' stand for alkyl groups which jointly contain not more than 8 carbon atoms, and wherein $n$ is any integer from 2 to 6 inclusive.

2. Dialkyl alkylene bis-ureas having the following structural formula:

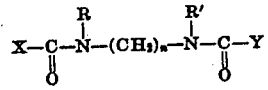

wherein $n$ is any integer from 2 to 6 inclusive, R and R' represent alkyl groups containing together not more than 8 carbon atoms and X and Y represent the imino radicals of different secondary amino compounds having a molecular weight not exceeding 120 and being members of the class consisting of dialkylamines and unsubstituted heterocyclic compounds having an NH group in the ring.

3. A process as defined in claim 1 wherein the amino groups X and Y are different.

4. Dialkyl alkylene bis-ureas having the following structural formula:

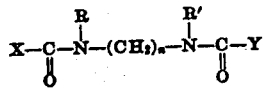

wherein $n$ is any integer from 2 to 6 inclusive, R and R' represent alkyl groups containing together not more than 8 carbon atoms, and X and Y represent the imino radicals of different dialkyl amines having molecular weights not exceeding 120.

5. Dialkyl alkylene bis-ureas having the following structural formula:

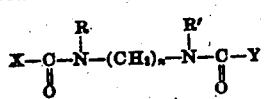

wherein $n$ is any integer from 2 to 6 inclusive,

R and R' represent alkyl groups containing together not more than 8 carbon atoms, X is the imino radical of a dialkyl amine having a molecular weight not exceeding 120, while Y is the imino radical of an unsubstituted heterocyclic secondary amine having a molecular weight not exceeding 120.

6. N:N' - dimethyl - trimethylene - diamine-N' - carboxylic - diethylamide - N - carboxylic-piperidide.

7. N:N' - dimethyl - hexamethylene - diamine-N' - carboxylic - diethylamide - N - carboxylic-morpholide.

8. N:N' - dimethyl - trimethylene - diamine-N - carboxylic - diethylamide - N' - carboxylic-dimethylamide.

WILLIAM ROBERT BOON.